United States Patent [19]

Berg

[11] Patent Number: 4,622,751
[45] Date of Patent: Nov. 18, 1986

[54] PRECISION ELECTROMECHANICAL MEASURING DEVICE

[76] Inventor: John W. Berg, 1085 Tasman Dr. #586, Sunnyvale, Calif. 94089

[21] Appl. No.: 755,457

[22] Filed: Jul. 16, 1985

[51] Int. Cl.$^4$ .............................................. G01B 7/31
[52] U.S. Cl. ................................ 33/169 C; 33/172 D; 33/DIG. 13
[58] Field of Search ............. 33/169 C, 172 D, 172 B, 33/172 E, 543, 559, 561, DIG. 13

[56] References Cited

U.S. PATENT DOCUMENTS

| | | | |
|---|---|---|---|
| 2,849,799 | 9/1958 | Müller | 33/172 D |
| 3,102,343 | 9/1963 | Plank | 33/172 D |
| 3,167,866 | 2/1965 | Steineman | 33/172 D |
| 3,303,572 | 2/1967 | Vreeland, Jr. | 33/178 E |
| 3,914,869 | 10/1975 | Merz et al. | 33/169 C |
| 4,084,323 | 4/1978 | McMurtry | 33/561 |

*Primary Examiner*—Willis Little
*Attorney, Agent, or Firm*—Thomas M. Freiburger

[57] ABSTRACT

A precision electromechanical measuring device utilizes a strain gauge or pressure transducer to sense changes of position in a workpiece contacting finger. The finger is pivotable about a relatively stiff pivot to different positions, enabling the instrument's use as a center finder for circular bores and pins or for verifying the flatness and perpendicularity of a disc or plate to the axis of rotation of a spindle. A housing of the device supports a rotatable shank extending from one end for engagement in a chuck, mandrel or collet associated with a spindle of a machine, and also supports pivotal apparatus including the finger extending out the other end of the housing. Brushes conduct a variable signal from the strain gauge in the housing to the exterior, where the signal is fed to an ammeter. In use as a center finder, the device is fixed in a chuck or mandrel, with a workpiece approximately alligned with the center of rotation of the mandrel, the finger is engaged against the interior of a bore or the exterior of a pin of the workpiece, and the machine spindle is power-rotated to sweep the finger around the bore or pin. Variations in the reading of the ammeter indicate eccentricity and direction and degree of eccentricity.

13 Claims, 9 Drawing Figures

PRECISION ELECTROMECHANICAL MEASURING DEVICE

BACKGROUND OF THE INVENTION

The invention relates to measuring and testing equipment, and more particularly to a precision instrument which utilizes variations in a signal from a strain gauge or other form of transducer to indicate a dimension or position.

Dial indicators, precision gauges and other measuring instruments in many forms are well known. For example, a standard for a long time has been a mechanical indicator sold under the trademark "Last Word" by the L. S. Starrett Company of Athol, Mass. An indicator of this type is placed in a drill chuck, for example, and the chuck is rotated slowly by hand while a finger of the indicator is engaged against a pin or bore, for locating the pin or bore on the center of rotation of the drill. Variations in the needle position of the mecanical indicator were noted as the chuck was rotated. The indicator was fairly accurate, but since it was used with the drill chuck hand rotated, it could not be completely accurate. When a machine spindle is not powered and rotating in the way it will be when performing a desired operation, there are slack effects and oil film effects in the spingle bearings which can give different readings from what occurs in the dynamic mode of operation.

Other dial indicators for generally the same purposes have been quite expensive, particularly those that have been the most sensitive. For example, a dial indicator sold under the name BesTest was graduated to 0.0001 inch. The operation of this dial indicator was mechanical, somewhat similar to the Last Word indicator.

Electronic indicators have also been in general use but have been far more expensive as compared to mechanical indicators. A number of such indicators are manufactured by Mitutoyo Mfg. Co. Ltd. of Japan, distributed in the United States by MTI Corporation of Paramus, N.J. For example, one Mitutoyo indicator adapted for some of the purposes of the present invention is the Digi-Matic indicator Model No. 543-162, shown on pages 13A-13B of the Mitutoyo Measuring Instruments Catalog No. 6000.

Such modern electronic indicators are very expensive principally because they use position-sensing transducers which are in themselves very costly components.

There has been a need for a relatively simple and inexpensive precision electromechanical measuring device for performing center finding functions and other position locating and dimension checking functions with a high degree of precision, and this is a principal object of the present invention described below.

SUMMARY OF THE INVENTION

The present invention is an efficient and relatively low cost precision electromechanical measuring device which in a preferred embodiment utilizes a simple strain gauge mounted in a housing, with a rotatable shank extending out one side of the housing and a repositionable, angularly adjustable workpiece contacting finger extending out the other end, rotatable with the shank. The internal strain gauge is mounted such that pressure against the contacting finger causes strain in the strain gauge. A signal, i.e., a change in resistance, from the strain gauge is commuicated through rotary brushes to an electronic display device, such as a milliammeter having a needle and dial or a digital readout. The instrument may be used for virtually any position locating or dimension verifying function, such as center finding for a bore or pin with respect to a rotational spindle, or for checking perpendicularity of a disc or other surface with respect to a spindle, or for measuring or verifying a dimension of a workpiece moved between the contacting probe and a fixed surface, as a height or width gauge.

In one embodiment, a precision measuring device in accordance with the principles of the invention comprises a body having means for connection to a piece of equipment and an arm-supporting means extending from the body, and with an arm pivotably connected to the arm-supporting means with means for limiting pivotal motion in one direction of the arm. A workpiece contacting finger is connected to and extends from the arm and has a position-sensing end opposite the arm, with pivotal attachment means connecting the finger and the arm in a relatively stiff connection which is pivotable with deliberate manual force to adjust the finger's position. This enables the finger to be oriented in any of a number of desired angular directions.

A moveable sensor member in association with the body or housing and in contact with the arm senses pivotal movement of the arm and finger together due to interfering engagement of the finger's position-sensing end with a tested surface or workpiece, which will slightly change the position of the moveable member. Within the housing is a bendable component engaged against the moveable member and mounted in a flexed position such that movement of the member by the arm will change the flexure in the bendable component. The bendable component may also act as a flat spring biasing the moveable member against the arm. Mounted on the bendable component is a strain gauge for sensing strain due to changes in flexure.

The strain gauge is connected by electrical means to send a signal representing strain to a display device such as an electronic meter with a dial or digital readout.

In this way, a workpiece or surface dimension or position relative to the body and the shank of the measuring device may be tested or measured by engagement of the workpiece or surface with the position-sensing end of the finger, with observation of the resulting strain in the strain gauge, so that precise tolerances in position and dimension measurement can be achieved. The device may be sensitive to 0.00001 inch in some applications.

Methods in accordance with the invention include use of the precision device in various modes of operation for precisely locating and verifying the location of a bore or pin of a workpiece along the axis of rotation of a spindle, for other precise position locating functions, and for precise measurement and inspection of dimensions in workpieces, by mounting the device of the invention on a appropriate testing stand.

In a variation of the device according to the invention, the testing finger may be engaged, through a damper such as a spring, with a simple pressure transducer such as a carbon pile, so that variations in the pivotal position of the contacting finger will cause subtle changes in the pressure sensed by the pressure transducer, varying an electrical signal received therefrom. Like strain gauges, pressure transducers are very inexpensive and can advantageously used in the present invention.

It is therefore among the objects of the invention to provide improved electromechanical measuring or position sensing devices having a very high degree of accuracy and sensitivity, with efficient and relatively simple construction and without costly position transducer components. These and other objects, advantages, features and characteristics of the invention will be apparent from the following description of preferred embodiments, considered along with the accompanying drawings.

DESCRIPTION OF THE DRAWINGS

FIGS. 8 and 9 are schematic views in elevation, showing variations of the instrument of the invention, both involving the use of a pressure transducer rather than a strain gauge as the sensing implement of the tool. In FIG. 8 the contacting finger is engaged through a compression spring with the pressure transducer in a lever arrangement, while in FIG. 9 the contacting finger acts through a flexed flat spring and a coil spring, so that the contacting finger may be pivotably reversed in position, as indicated.

DESCRIPTION OF PREFERRED EMBODIMENTS

Figure 1:
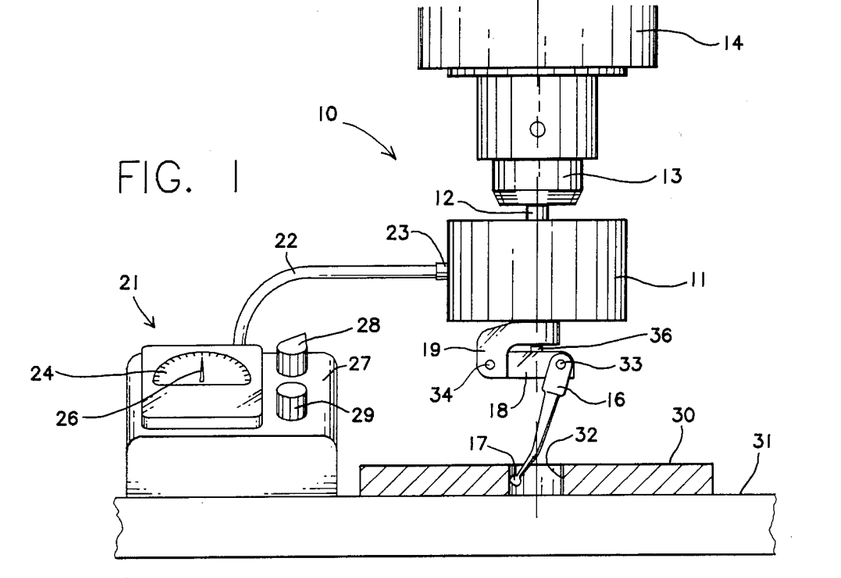
FIG. 1 is an elevation view showing a measuring device in accordance with the invention gripped in a chuck or mandrel of a machine including a rotational spindle, and with a contacting finger of the device in engagement with a circular bore of a workpiece, whose center line is to be precisely aligned with the axis of rotation of the machine'e spindle. Shown in FIG. 1 is a display instrument electrically connected with the body of the measuring device for displaying a reading to an operator as the spindle and the contacting finger are rotated.

In the drawings, FIG. 1 shows a position indicator and measuring device in accordance with the invention and generally indicated by the reference number 10. The device includse a body or housing 11, a rotatable shank 12 for engagement with a chuck or mandrel 13 of a machine or tool including a spindle, such as a drill press 14, and an angularly adjustable contacting finger 16 having a position-sensing end 17, mounted on an arm 18 and arm holder 19 at the other side of the housing 11, all rotatable with the shank 12 and with respect to the housing 11.

The testing device 10 also includes a display instrument 21 as shown, connected by an electrical lead 22 to an input connection 23 with the housing. The display instrument 21 may include a dial 24 with an indicator needle 26, or it may have other appropriate display means, such as a digital readout, and it includes a display housing 27 within which is contained electrical circuitry for controlling the position of the needle 26 (or other display) in response to signals received from within the housing 11, as will be further seen below. The instrument may include adjustment knobs 28 and 29, one of which can be used to switch the instrument to different levels of sensitivity and one of which is used to zero the needle 26 position.

The circuitry within the housing 27 may be shown in the schematic circuit diagram of FIG. 3, further explained below.

As can be seen from FIG. 1, the shank 12 of the position indicator and measuring device 10 is placed into the chuck 13 of the machine 14 and tightened therein. A workpiece 30 is then positioned immediately below the chuck 13 and the rotatable spindle (not shown) of the machine 14, on a rigid table 31 or other stable work surface. The workpiece 30 has some feature having an axis with which the axis of rotation of the machine's spindle is to be precisely aligned. In the illustration of FIG. 1, this feature is a bore 32.

With the workpiece 30 roughly positioned on the surface 31 such that the bore 32 is approximately aligned with the spindle above, the chuck 13 is lowered so that the position-sensing end 17 of the finger is within the bore 32. The finger is adjusted in its angular orientation about a pivot 33 such that it tightly engages against a side of the bore 32, as illustrated. The pivot 33 does not permit free rotation, but rather is relatively stiff so that a deliberate manual force must be applied to the finger 16 in order to change its position and such that, if a resistance or interference is encountered by the finger 16 in the bore, rotation of the finger and arm 18 together will first occur, about another pivot point 34 between the arm 18 and the arm holder 19. Such rotation, even the slightest rotation, pushes up on a spring-loaded movable member 36 in engagement with the arm 18, preferably in the form of a rod or pin as shown.

Once the device has been set up as described and as illustrated in FIG. 1, the machine 14 is powered to rotate the device's shank 12 and connected members 19, 18 and 16, and the position-sensing end 17 of the finger sweeps around the bore 32 in a circular path of contact therewith. Varying pressures of the bore wall against the finger as the spindle rotates, due to eccentricity of the bore 32 with respect to the spindle, even to a very slight degree, will cause the needle 26 of the display instrument 21 to fluctuate. This indicates the eccentricity to the operator, and also the orientation of the eccentricity as related to the maximum and minimum positions of the needle 26 as the spindle and finger 16 rotate, and can then adjust the position of the workpiece 30 on the table 31 accordingly.

As is well known by those in the machining art, the table or work surface 31 will have capability for fine position adjustments of the surface to move the workpiece 30 by very fine increments as desired. Such apparatus is not shown in the drawings.

Figure 2:
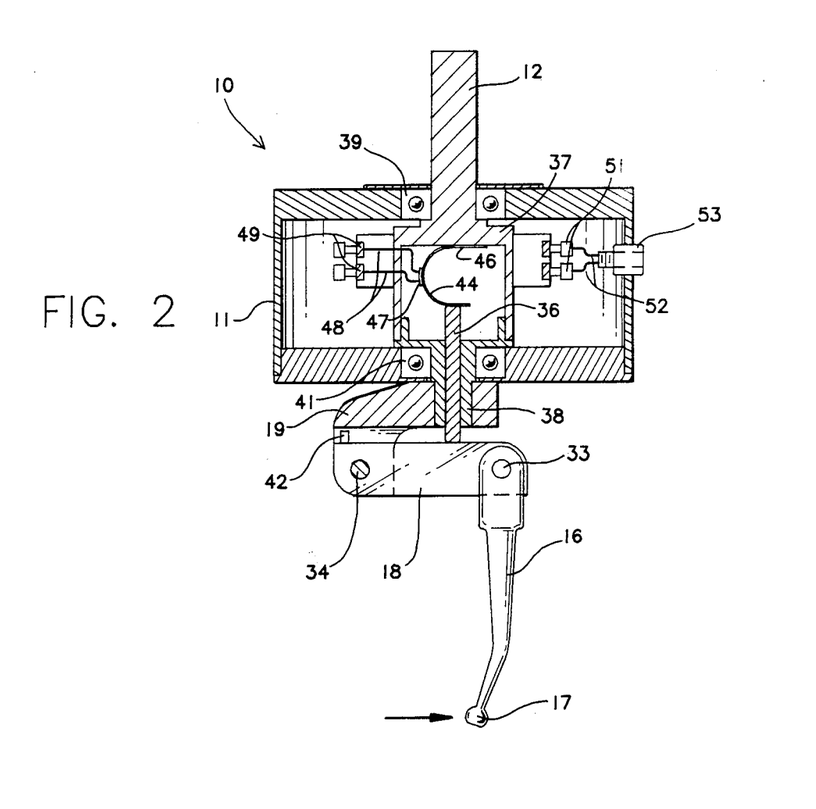
FIG. 2 is a sectional view of the device shown in FIG. 1, excluding the display instrument and showing the interior of a housing of the device which contains a strain gauge for sensing changes of position of the contacting finger with a high degree of sensitivity.

FIG. 2 shows, primarily in cross section, the internal components of the device 10 including the body or housing 11. As illustrated, the shank 12 extending out the top of the housing 11 is secured to or integral with an interior bracket or casing 37, which in turn is secured, in this preferred embodiment of the invention, to a hollow shaft 38 extending out the lower end of the housing 11. Precision bearings 40 and 41 secure these members for rotation together with respect to the housing, as illustrated in the drawing.

FIG. 2 shows that the finger-supporting arm 18, supported at the pivot point 34, is permitted rotation in an upward direction only, held by a stop member or pin 42 against rotation in the downward direction, and defining a limit position for the arm 18 which may be approximately horizontal as shown. The stop member 42 engages against a ledge or other structure of the arm supporting member 19 as shown.

The arm supporting member 19 is fixed to the hollow shaft 38 by any suitable means, such as by appropriate dimensioning of the two members such that the arm support 19 is tightly press-fit onto the exterior of the hollow shaft 38.

The moveable member or pin 36 is slidable within a central bore of the hollow shaft 38, and movements of the arm 18 are transferred, by sliding movement of the member 36, to a bendable member 44 fixed at one end 46 to the bracket 37. The bendable member 44 may essentially comprise a flat spring, and it exerts a constant biasing force downward on the moveable member or pin 36, thereby urging the arm 18 toward its zero or base position shown.

The bendable member or spring 44 has secured to it (as by glueing or other appropriate means) a strain gauge 47 which will undergo flexure strain with the flexure of the member 44 due to movement by the moveable sensor member 36. As is well known, changes in strain of the strain gauge 47 will vary the resistance of the strain gauge when a current is passed through it, and in this preferred embodiment of the invention this is the manner in which even the slightest movement at the end 17 of the finger 16 is detected.

The strain gauge 47 is connected by a pair of wire leads 48 to a corresponding pair of annular contacts 49 which are engaged by brushes 51 which are held stationary within the housing 11. Such sets of contact and brushes are well known in electrical arts and do not in themselves form a part of the invention. The brushes 51 are connected by exit leads 52 to a coupling connection 53 which, as shown in FIG. 1, is connected with the input connector 23 of the electrical lead 22 when the device 10 is to be operated.

Figure 3:
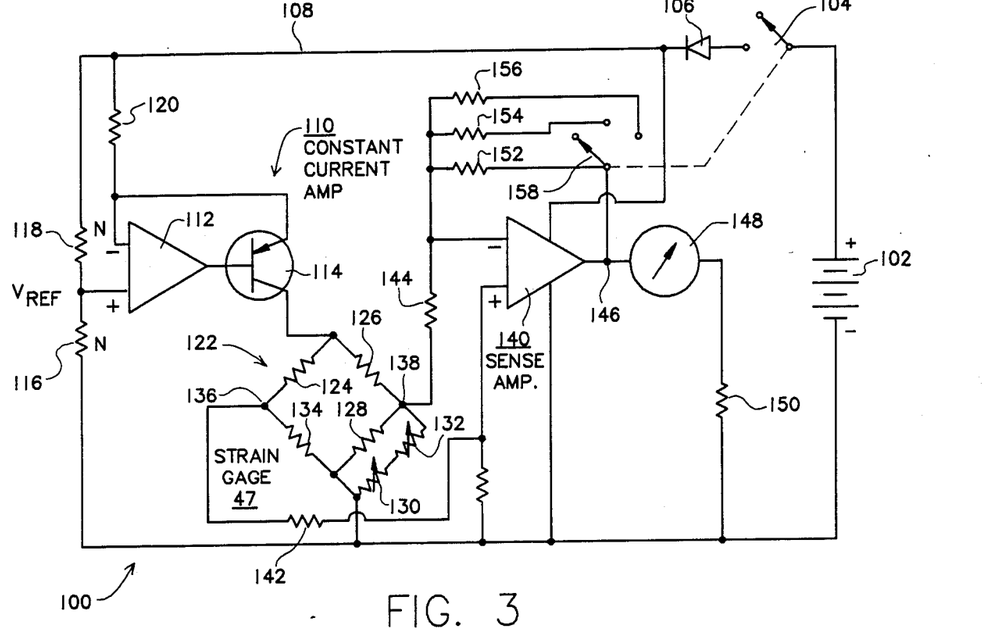
FIG. 3 is a circuit diagram showing one form of circuitry for the device of the invention.

FIG. 3 shows schematically a form of electrical circuitry in accordance with the invention which may be used in the electric display instrument 21 of the device 10. The curcuit 100 of FIG. 3 is described below.

Figure 4:
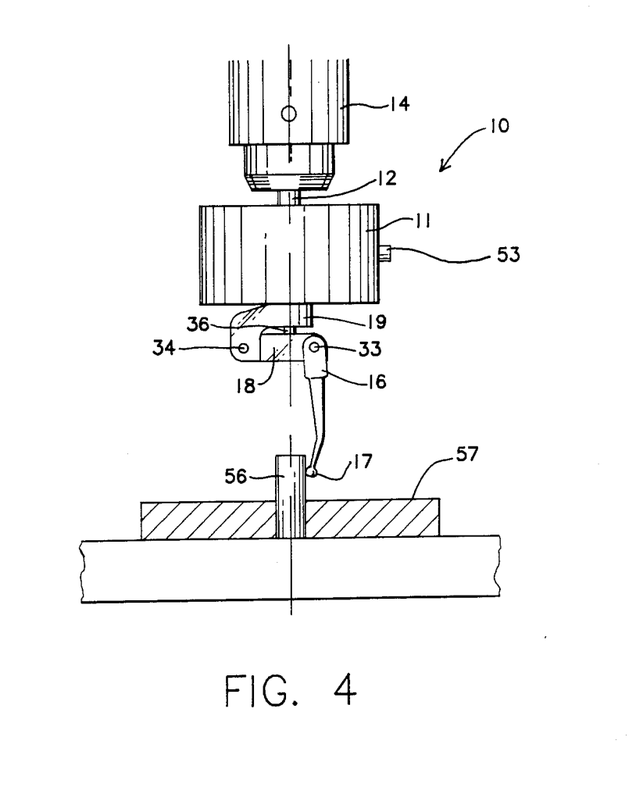
FIG. 4 is a view similar to FIG. 1, but showing the contacting finger of the device in contact with the exterior of a circular pin which is to be precisely located with its center on the axis of the machine's spindle.

FIG. 4 shows the use of the device 10 of the invention (shown without the display instrument 21) for centering the spindle of the machine 14 about a cylindrical pin 56, rather than a bore, of a workpiece 57. In this case, the finger 16 is manually moved outwardly about its stiff pivot 33 on the arm 18, to a position wherein the position-sensing end 17 of the finger 16 contacts the exterior surface of the pain 56 as shown. Again, slight fluctuations in the position of the finger 16 as the spindle rotates under power of the machine will cause the slidable position-sensing member 36 to vary the strain in the strain gauge (FIG. 2) and will therefore be registered on the display instrument 21 (FIG. 1). The end of the finger 16 contacts the pin 56 in a circular path of contact, the eccentricity of the pin 56 with respect to the axis of the spindle above will cause the arm 18 to swing up and down about its pivot 34.

Figure 5:
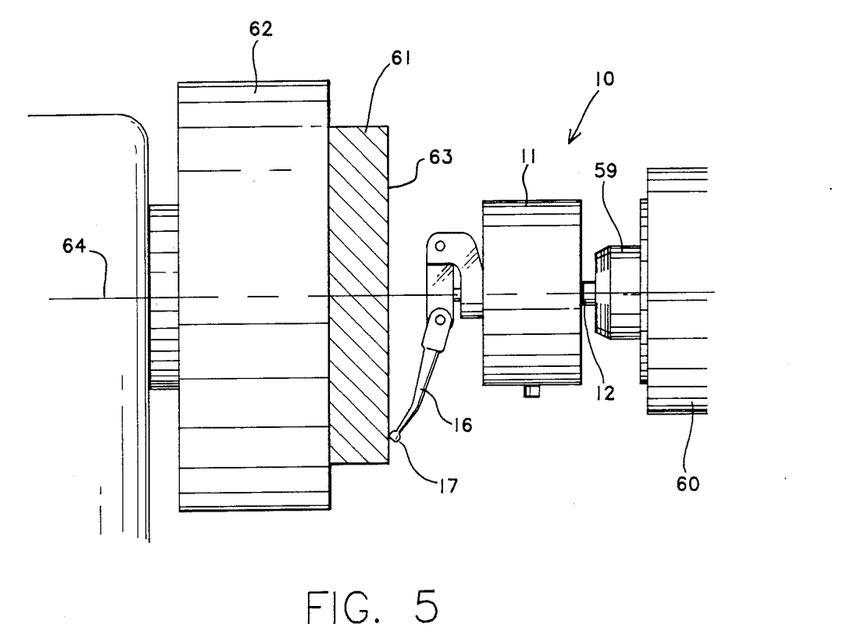
FIG. 5 is an elevation view showing the measuring device mounted on a machine having a horizontal-axis spindle, such as a milling machine, and with the contacting finger in engagement with the flat disc or surface whose perpendicularity with the spindle's axis is to be verified.

In FIG. 5 there is shown another use of the device 10 of the invention. Again, the display instrument 21 is not shown in this view.

In this use of the invention, the device 10 is connected via a collet or other holding device 59 to a machine 60 having a horizontal rotational spindle, such as a milling machine. A workpiece 61 is held by a holder 62 opposite the machine 60, and the workpiece has a flat surface 63 which is to be made perpendicular with an axis 64 of rotation of the milling machine. Perpendicularity is verified or checked using the device 10 of the invention, by extending the contacting finger 16 to an outwardly pivoted position as shown, such that the position-sensing end 17 is in engagement with the flat surface 63 when the collect 59 and device 10 are moved into the position shown.

The milling machine 60 is powered so that its spindle rotates to rotate the shank 12 and finger 16 assembly of the device 10, causing the finger end 17 to make a circular path of contact with the workpiece surface 63. As explained above, the body 11 of the device 10 is kept from rotating by the connection of the electrical lead wire 22 in this embodiment (not shown in FIG. 5—see FIG. 1).

As can be envisioned from FIG. 5, if the workpiece surface 63 is not precisely perpendicular to the spindle axis 64, this will cause a varying strain in the strain gauge (as shown in FIG. 2), and the direction of the non-perpendicularity can be ascertained by the operator using the display instrument 27 and observing the position of the finger 16.

The setup shown in FIG. 5 can also be used to check for warpage or other imperfections in the flatness of the surface 63.

Figure 6:
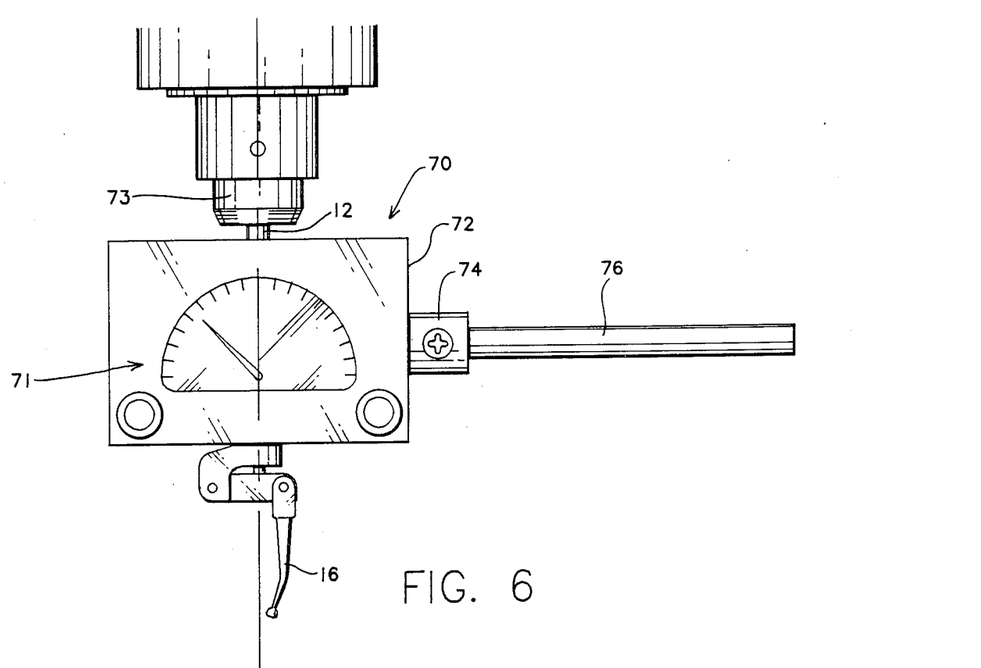
FIG. 6 is an elevation view showing a modified embodiment of the invention wherein the display instrument is built into the housing of the device.

FIG. 6 shows a modification of the invention, wherein a position indicator and measuring device 70 has a display instrument 71 built into a body or housing 72 of the device. The operative structure and features of the device 70 of FIG. 6 are similar to those described above with respect to FIGS. 1 and 2, with an upper shank 12 which can be received in a collet or chuck or other holding device 73, and a lower finger assembly including the contacting finger 16, fixed to the shank for rotation along with the shank and with respect to the body or housing 72. Again, the circuitry within the display indicator instrument 71 may be similar to what is represented in FIG. 3, described below.

With the device as shown in FIG. 6, there is a need to prevent rotation of the housing 72 when the spindle of the machine including the collet 73 is rotated. Since there is no lead wire extending from the housing, in this case there is included a connector or socket 74 at the side of the housing 72, for receiving a bar 76 or other appropriate projection to engage with a component of the machine on which the device is used, or on the work table or other implement supporting the workpiece which is to be engaged by the finger 16. Milling machines and other such machines with which the invention is concerned will normally include provision for engaging such a projection 76 to stop rotation.

Figure 7:
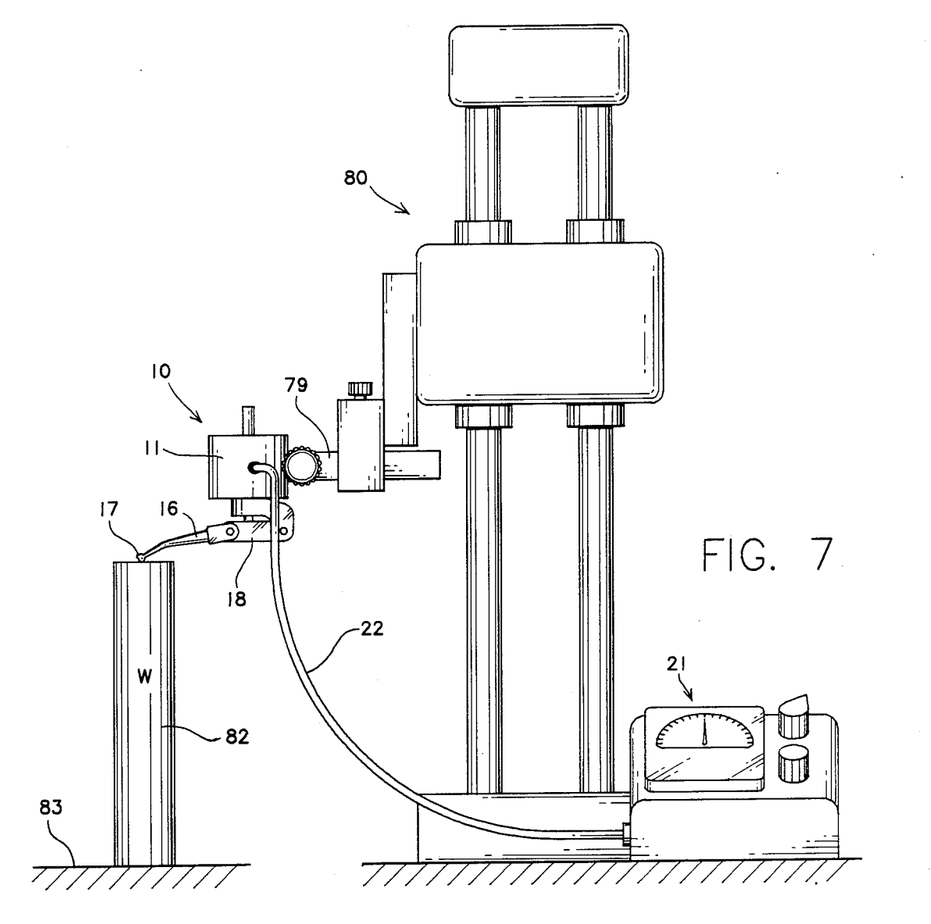
FIG. 7 is an elevation view showing another use of the device of the invention, secured to a test stand and with the contacting finger is extended, generally horizontal position for measuring or verifying a dimension such as the height of a workpiece.

In FIG. 7 a holding device 10 of the invention is utilized in a different manner, not involving rotation. The body or housing 11 is secured to a structural member 79 of an adjustable stand 80 of a well-known type. In this method of using the invention, the finger 16 is adjusted to an outstreched position as shown, generally in a horizontal orientation, and the device 10 is used as a height gauge. A workpiece 82 is moved between a table or other fixed surface 83 and the end 17 of the finger 16, causing the arm 18 to move upwardly somewhat, changing the strain and the resistance in the strain gauge and changing the indication on the instrument 21. It should be understood that the device depicted in this method can be either the device 10 shown in FIGS. 1 and 2 or the alternate form of device 70 shown in FIG. 6, and that any exterior dimension may be checked or measured by passing a workpiece between the finger 16 and the surface 83.

The device 10 may first be calibrated so that a certain known value is displayed on the instrument 21 when the correct height between the finger end 17 and the fixed surface 83 is present, and with variations of the instrument reading in either direction being correlated with permitted tolerances. Calibration may be accomplished by first putting a workpiece or known correct height under the contacting finger 16, and testing a series of further workpieces using this first reading as a reference.

Figure 8:
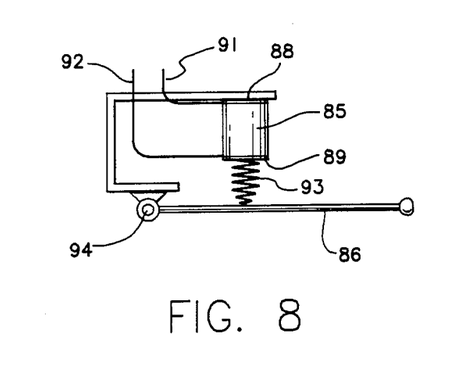
Figure 9:
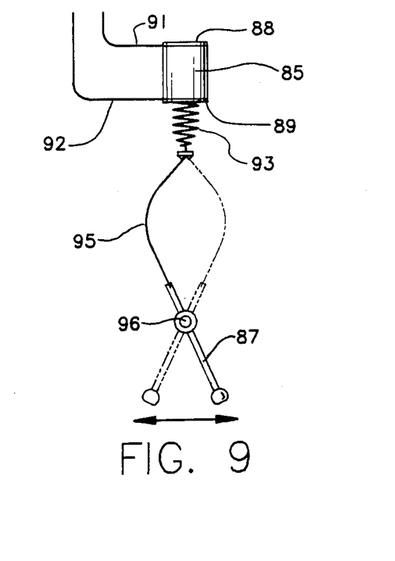

FIGS. 8 and 9 show in schematic representation some variations of the invention wherein strain gauges are not used. In both FIGS. 8 and 9, a pressure transducer 85 is used to sense changes of position of a contacting finger 86 (FIG. 8) or 87 (FIG. 9). The pressure transducer may be any of a number of simple and inexpensive pressure transducers, such as a simple carbon pile which operates by sensing changes in resistance between its two conductive ends 88 and 89, conducted to wire leads 91 and 92 as indicated. The upper end 88 of the pressure transducer in each case is fixed in position. Housing and other supporting structure are not shown.

In FIG. 8, changes in position of the finger 86 are sensed through a spring 93, such as a compression coil spring as shown. Upward movement of the finger 86 in FIG. 8, about a pivot 94, will increase pressure between the ends of the pressure transducer 85, thereby changing the resistance of the pressure transducer and affecting a reading on an instrument (not shown). The spring enables free motion of the finger 86 while transferring the effects of movement to the pressure transducer. As an alternative to the coil spring 93, the finger could itself include a flat spring portion. It should also be understood that the instruments shown in FIGS. 8 and 9 are schematic, and that the finger 86 or 87 may be oriented in any direction or may have bends or angles rather than being straight as represented.

In FIG. 9, the arrangement is similar except that the finger 87 acts through a flat spring 95 engaged with a compression spring 93, and a fixed-position finger pivot 96 is located between the ends of the finger. This enables the orientation of the finger 87 to be reversed, as indicated in solid lines and dashed lines in FIG. 9. The finger may be flipped over-center so that the flat spring 95 flips over to an opposite orientation, making the tool more versatile.

A suitable electrical circuit 100 for operating the electromechanical measuring device of the invention is shown in FIG. 3. Therein the circuit includes a power source, such as a small batter 102 which may be a 9-volt battery, connected as shown in FIG. 3. Voltage from the battery 102 passes through the contacts of a switch 104 and a one way diode 106 to a voltage supply line 108. The voltage on the line 108 follows two paths: the first path is through a constant current source 110 comprising an operational amplifier 112 and transistor 114. A network of resistors 116 and 118 divides the voltage on the line 108 and applies the divided voltage at the reference node of the operational amplifier 112. The inverting node of the operational amplifier 112 is connected to the supply line 108 through another resistor 120. The emitter of the PNP transistor 114 is directly connected to the inverting input of the amplifier 112 as a feedback connection.

A constant current is supplied from the collector of the driver transistor 114 to a bridge 122. The bridge includes fixed resistances 124, 126 and 128 and variable resistances 130 and 132 as shown in FIG. 3. The resistance of the strain gauge 47 is diagramed in FIG. 3 by the resistance 134 and this is a variable resistance depending upon the physical displacement of the strain gauge sensor 47, following flexure displacement of the flat spring 44 (FIG. 2). This causes the resistance 134 to change and thereby causes a change in the paths of current flowing through the bridge 122.

Two sense nodes 136 and 138 are connected to the inputs of a second operational amplifier 140 through resistors 142 and 144. The operational amplifier 140 senses the shift in current through the legs of the bridge 122 and converts that shift in current to an output current at a node 146. This node 146 is connected through a milliammeter 148 (represented by the needle 26 in FIG. 1), and a series resistor 150 to the ground return for the power supply 102. Additionally, the node 146 is selectively connected through feedback resistors 152, 154 or 156 which are selectable via a switch 158 to control the gain of the operational amplifier 140. The switch 158 thereby controls a range of scaling of the strain gauge electrical circuitry. For convenience, the switch 158 may be ganged with the switch 104 so that a single knob may be provided to control these functions, e.g., the control knob 28 shown in FIG. 1.

In the resistance bridge 122, two variable resistors 130 and 132 are provided. One of these resistors may be conveniently provided as a panel control so that the milliammeter may be zeroed or set at a reference point when the strain gauge 47 is in a nominal or reference position, via the control knob 29 shown in FIG. 1 which actuates one of the resistors 130 or 132. The resistor 130 may be of lower value than the resistor 132 and may be the resistor controlled by the control knob 29. The other resistor 132, of higher value, may be an initial calibration resistor operated by a tool but not used in normal operation like the resistor 130.

In operation the strain gauge 47 (in the embodiment shown in FIG. 2) has an initial position defined by the mechanical components of the device. The switch 104 (knob 28) is turned on so that current is permitted to flow from the battery 102 onto the supply line 108. Current then passes through the constant current source 110 to the bridge 122 and is divided into two paths: a first path comprising the resistors 126, 128, 130 and 132 to return to the battery or power supply; and a second path consisting of the resistor 124 and the resistance element 134 of the strain gauge itself. The resistors 130 and 132 are provided so that the resistance in the first leg of the bridge may be made the same as the resistance in the second leg of the bridge in an initial setting of the strain gauge 47 so that there is not current put out by the operational amplifier 140 and so the milliammeter reads at the zero mark or nondeflected mark of its scale (or it may be calibrated to read a specific value, as a reference reading on a known-dimension test part as in the height gauge application shown in FIG. 7).

When the strain gauge is deflected, the resistance element 134 changes, upsetting the current passing through the bridge 122. This change in the amount of current passing through each of the legs of the bridge causes an imbalance at the inputs of operational amplifier 140 which in turn causes current to flow at its output, both through the milliammeter 148 and resistor 150 to the ground return, and also through the feedback path to the inverting input of the operational amplifier 140 to control its gain.

The scale of the milliammeter may be conveniently marked off in desired units representing distance of movement of the finger's contacting end 17, so that the milliammeter will be direct reading.

The circuit 100 shown in FIG. 3, though indicating a strain gauge 47 at the resistance element 134, may also be used in conjunction with the embodiments of the invention shown in FIGS. 8 and 9. In those embodiments the pressure transducer 85 is a resistance-varying member, and may be represented by the resistance 134 in the circuit 100 of FIG. 3.

The above described preferred embodiments are intended to illustrate the principles of the invention, but not to limit the scope of the invention. Variations to these embodiments will be apparent to those skilled in the art and may be made without departing from the spirit and scope of the invention as defined in the following claims.

I claim:

1. A position indicator and measuring device, comprising:
   a housing;
   a contacting finger pivotally connected to the housing, with a position-sensing end for contacting a surface of a workpiece;
   a pressure transducer connected to the housing and having a pair of ends between which is contained a material whose resistance varies in accordance with pressure exerted on the material by the ends, both ends being connected to electrical leads and one end being fixed in position with respect to the housing;
   spring means operably connected between the finger and the other end of the pressure transducer opposite said one end, for transmitting pivotal movements of the finger into changes of pressure against said other end of the pressure transducer and into changes of resistance in the pressure transducer for communication through the electrical leads; and
   electrical display means for providing an indication to an operator of such changes in resistance and movements of the finger.

2. The position indicator of claim 1, wherein the spring means comprises a compression coil spring positioned between the pressure transducer and the finger.

3. The position indicator of claim 1, wherein the spring means comprises a compression coil spring acting against said other end of the pressure transducer and a flexed flat spring engaged between the coil spring and an end of the finger opposite the position-sensing end, the finger being pivoted between its two ends such that its orientation may be reversed by pivoting it to force the flat spring to flip to an opposite flexed orientation.

4. A position indicator and measuring device comprising:
   a body having means for connection to a piece of equipment;
   finger-supporting means connected to the body;
   a contacting finger pivotally connected to the finger-supporting means and having a position-sensing end;
   a stress-responsive resistance-varying pressure transducer supported by the body and having means for varying resistance to current flow through the member in response to stress applied to the member;
   flexible linkage means engaged between the contacting finger and the resistance-varying member for exerting a spring biasing force on the contacting finger and for transmitting pivotal movements of the finger into stress variations in the resistance-varying member; and
   electrical means connected to the resistance-varying member for passing a current through the resistance-varying member and measuring resistance therethrough and including display means for providing an indication to an operator representing finger movements via stress variations in the resistance-varying member;
   whereby a workpiece or surface dimension or position relative to the body of the position indicator may be tested or measured by engagement of the workpiece or surface with the position-sensing end of the finger, and by observation of the resulting resistance in the resistance-varying member, so that precise tolerances in position and dimension measurement can be achieved.

5. The device of claim 4, wherein the flexible linkage means comprises a compression coil spring positioned between the pressure transducer and the finger.

6. The device of claim 4, wherein the flexible linkage means comprises a compression coil spring acting on the pressure transducer and a flexed flat spring engaged between the coil spring and an end of the finger opposite the position-sensing end, the finger being pivoted between its two ends such that its orientation may be reversed by pivoting it to force the flat spring to flip to an opposite flexed orientation.

7. A position indicator and masuring device comprising:
   a body having means for connection to a piece of equipment;
   finger-supporting means connected to the body;
   a contacting finger pivotally connected to the finger-supporting means and having a position-sensing end;
   a stress-responsive resistance-varying member supported by the body and having means for varying resistance to current flow through the member in response to stress applied to the member;
   flexible linkage means engaged between the contacting finger and the resistance-varying member for exerting a spring biasing force on the contacting finger and for transmitting pivotal movements of the finger into stress variations in the resistance-varying member; and
   electrical means connected to the resistance-varying member for passing a current through the resistance-varying member and measuring resistance therethrough and including display means for providing an indication to an operator representing finger movements via stress variations in the resistance-varying member;

and further including power means associated with the electrical means; constant current supply means connected to the power supply means for supplying a constant current; resistance bridge means with two legs and including a resistance element of the resistance-varying member in a leg thereof, said resistance bridge being connected to said constant current supply means; and current sensing means connected to said bridge means for sensing imbalance in the legs thereof and for indicating on the display means the amount of imbalance;

whereby a workpiece or surface dimension or position relative to the body of the position indicator may be tested or measured by engagement of the workpiece or surface with the position-sensing end of the finger, and by observation of the resulting resistance in the resistance-varying member, so that precise tolerances in position and dimension measurement can be achieved.

8. The device of claim 7, wherein the current sensing means comprises an operational amplifier connected to nodes of the resistance bridge means, and wherein the display means comprises an analog metering device connected to indicate the current flowing at the output of the operational amplifier.

9. The device of claim 8, further including means for manually setting the gain of the system by controlling the feedback of the current sensing operational amplifier.

10. A precision electromechanical measuring device comprising:

a body;

a shank extending from one side of the body along a rotational axis, and mounted in the body for rotation with respect to the body, and an arm-supporting means secured to the shank for rotation therewith and extending from an opposite side of the body;

an arm pivotally connected to the arm-supporting means in a first pivotal connection, including means for limiting pivotal motion in one direction of the arm with respect to the arm-supporting means, defining a zero or base position and permitting pivotal movement away from the zero position;

a contacting finger connected to and extending from the arm and having a position-sensing end opposite the arm, and including pivotal attachment means connecting the finger and the arm in a relatively stiff connection which is pivotable with deliberate manual force so that the finger can be oriented in any of a number of desired angular directions;

a moveable sensor member in biased contact with the arm such that movement of the arm and finger together about the first pivotal connection due to interfering engagement of the finger's position-sensing end with a tested surface or workpiece will change the position of said moveable member;

a bendable component acting as a spring within the body and engaged in spring-biased engagement against the moveable sensor member to constantly urge the moveable sensor member against the arm such that the arm is constantly urged toward its zero position and such that movement of the moveable sensor member by the arm will change the flexure of the bendable component, and including a strain gauge mounted on the bendable component for sensing strain occurring with changes in flexure of the bendable component;

and electrical means connected to the strain gauge for sending a current through the strain gauge and measuring resistance therethrough representing flexure strain induced in the bendable component by the moveable sensor member and including display means for providing an indication to an operator representing strain and changes in strain associated with the bendable component;

whereby the shank can be rotated with a chuck or mandrel of a machining tool, under power, with the body held stationary and with the arm and finger rotating along with the shank and with the position-sensing finger in contact with a workpiece surface in a circular path of contact, for determining a dimension or position of said surface by observation of resulting strain in the strain gauge and fluctuations in strain of the strain gauge, so that precise tolerances in position and dimension measurement can be achieved.

11. The device of claim 10, including a bearing-mounted rotational unit mounted for rotation with respect to the body and having the shank fixedly connected thereto, a hollow shaft fixedly mounted with the bearing-mounted rotational unit and extending out the opposite side of the body and on a common axis with the shank, said arm-supporting means being affixed to the outside of the hollow shaft, and said moveable sensor member comprising a slideable pin positioned concentrically inside the hollow shaft and slideable with respect thereto, the pin being engaged in compression against the arm and against the bendable spring component bearing the strain gauge, the bendable component being secured to the rotatable unit, and including electrical brushes electrically connecting the strain gauge with a remaining portion of the body outside the rotatable unit, so that the signal from the strain gauge may be communicated to the display means when the rotatable unit is rotating and the body is stationary, whereby the shank may be engaged in the rotatable chuck or mandrel, with the body held stationary, and with the finger manually adjusted at a desired angle to contact a workpiece or a surface in a circular path of contact and to cause flexure displacement of the bendable component and strain in the attached strain gauge indicative of dimension or position of a workpiece or of portions of the circular pattern of contact, and whereby the contacting finger and arm act as one rigid unit bearing on a fulcrum comprising the first pivotal connection and fixed to a second unit comprising the bearing-mounted rotational portion, and the slideable pin directly transfer the motion of the arm-finger unit to the bendable spring component having the strain gauge.

12. A method for centering a rotatable spindle with respect to a circular bore or pin which is to be positioned on a common axis with the spindle, comprising, providing a precision electromechanical measuring device comprising a body; a shank extending from one side of the body along a rotational axis, and mounted in the body for rotation with respect to the body, and an arm-supporting means secured to the shank for rotation therewith and extending from an opposite side of the body; an arm pivotally connected to the arm-supporting means in a first pivotal connection, including means for limiting pivotal motion in one direction of the arm with respect to the arm-supporting means, defining a zero or base position and permitting pivotal movement away from the zero position; a contacting finger connected to and extending from the arm and having a position-sensing end opposite the arm, and including pivotal attachment means connecting the finger and the arm is a relatively stiff connection which is pivotable with deliberate manual force so that the finger can be oriented in any of a number of desired angular directions; a moveable sensor member in biased contact with the arm such that movement of the arm and finger together about the first pivotal connection due to interfering engagement of the finger's position-sensing end with a tested surface or work-piece will change the position of said moveable member; a bendable component acting as a spring within the body and engaged in spring-biased engagement against the moveable sensor member to constantly urge the moveable sensor member against the arm such that the arm is constantly urged towards zero position and such that movement of the moveable sensor member by the arm will change the flexure of the bendable component, and including a strain gauge mounted on the bendable component for sensing strain occurring with changs in flexure of the bendable component; and electrical means connected to the strain gauge for sending a current through the strain gauge and measuring resistance therethrough representing flexure strain induce in the bendable component by the moveable sensor member and including display means for providing an indication to an operator representing strain and changes in strain associated with the bendable component;

engaging the shank of the measuring device in a chuck or mandrel in fixed relation with respect to the spindle; and manually positioning the finger such that its position-sensing end tightly engages against the surface of the bore or pin; and powering the spindle to rotate the spindle to move the position-sensing end of the finger in a circular path of contact against the bore or pin while observing the display means indicating changes in strain of the strain gage and indicating eccentric positioning of the bore or pin with respect to the spindle, and adjusting the position of the bore or pin until a minimum fluctuation in the reading of the display means is observed as the spindle rotates.

13. A method for testing a substantially flat surface for perpendicularity with respect to the axis of rotation of a rotatable spindle of a machine, comprising, providing a precision electrochemical measuring device comprising a body; a shank extending from one side of the body along a rotational axis, and mounted in the body for rotation with respect to the body, and an arm-supporting means secured to the shank for rotation therewith and extending from an opposite side of the body; an arm pivotally connected to the arm-supporting means in a first pivotal connection, including means for limiting pivotal motion in one direction of the arm with respect to the arm-supporting means, defining a zero or base position and permitting pivotal movement away from the zero position; a contacting finger connected to and extending from the arm and having a position-sensing end opposite the arm, and including pivotal attachment means connecting the finger and the arm is a relatively stiff connection which is pivotable with deliberate manual force so that the finger can be oriented in any of a number of desired angular directions; a moveable sensor member is biased contact with the arm such that movement of the arm and finger together about the first pivotal connection due to interfering engagement of the finger's position-sensing end with a tested surface or work-piece will change the position of said moveable member; a bendable component acting as a spring within the body and engaged in spring-biased engagement against the moveable sensor member to constantly urge the moveable sensor member against the arm such that the arm is constantly urged towards zero position and such that movement of the moveable sensor member by the arm will change the flexure of the bendable component, and including a strain gauge mounted on the bendable component for sensing strain occurring with changes in flexure of the bendable component; and electrical means connected to the strain gauge for sending a current through the strain gauge and measuring resistance therethrough representing flexure strain induce in the bendable component by the moveable sensor member and including display means for providing an indication to an operator representing strain and changes in strain associated with the bendable component;

engaging the shank of the measuring device in a chuck or mandrel in fixed relation with respect to the spindle;

manually positioning the finger such that its position-sensing end tightly engages against the surface of the bore or pin; and powering the spindle to rotate the spindle to move the position sensing end of the finger in a circular path of contact against the bore or pin while observing the display means indicating changes in strain of the strain gauge and indicating eccentric positioning of the bore or pin with respect to the spindle, and adjusting the position of the bore or pin until a minimum fluctuation in the reading of the display means is observed as the spindle rotates.

* * * * *